(12) United States Patent
Kimura et al.

(10) Patent No.: US 7,631,216 B2
(45) Date of Patent: Dec. 8, 2009

(54) INFORMATION PROCESSING APPARATUS, INFORMATION PROCESSING APPARATUS CONTROL PROGRAM, AND INFORMATION PROCESSING APPARATUS CONTROL METHOD

(75) Inventors: Masatoshi Kimura, Kawasaki (JP); Naoki Iwasa, Kawasaki (JP); Kouichi Kawata, Kawasaki (JP); Hiroyuki Maekawa, Kawasaki (JP); Akiko Maruyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 429 days.

(21) Appl. No.: 11/316,962

(22) Filed: Dec. 27, 2005

(65) Prior Publication Data

US 2007/0050577 A1 Mar. 1, 2007

(30) Foreign Application Priority Data

Aug. 26, 2005 (JP) ............................. 2005-245210

(51) Int. Cl.
*G06F 11/00* (2006.01)
(52) U.S. Cl. .......................................................... 714/5
(58) Field of Classification Search ..................... 714/5, 714/6
See application file for complete search history.

(56) References Cited

U.S. PATENT DOCUMENTS

| | | | | |
|---|---|---|---|---|
| 5,715,462 | A | 2/1998 | Iwamoto et al. ............. | 395/712 |
| 6,901,493 | B1 * | 5/2005 | Maffezzoni ................. | 711/162 |
| 2003/0182547 | A1 | 9/2003 | Kumagai | |
| 2003/0188223 | A1 | 10/2003 | Alexis ......................... | 714/13 |
| 2004/0078680 | A1 | 4/2004 | Hu et al. | |
| 2004/0230702 | A1 | 11/2004 | Sukigara | |

FOREIGN PATENT DOCUMENTS

| | | |
|---|---|---|
| EP | 0774716 | 5/1997 |
| EP | 1510 920 | 3/2005 |

(Continued)

OTHER PUBLICATIONS

Extended European Search Report dated Nov. 5, 2007 in corresponding European Application No. 05028299.5-2224 (7 pages).

*Primary Examiner*—Bryce P Bonzo
(74) *Attorney, Agent, or Firm*—Fujitsu Patent Center (57) ABSTRACT

There is disclosed an information processing apparatus, information processing apparatus control program, and information processing apparatus control method which improve system-recoverability. The information processing apparatus copies contents of a first OS partition storing a first OS 31, and comprises: a copy setting section 32 which works on the first OS 31, sets startup information in a non-volatile memory when the information processing apparatus is started up next, the startup information giving an instruction about startup of a second OS 41 stored on a second OS partition as a partition different from the first OS partition, sets a copy identification file 56 giving an instruction about copying of the contents of the first OS partition, and restarts the information processing apparatus; a BIOS 21 which works when the information processing apparatus is started up, and starts up the second OS 41, based on the startup information; and a copy execution section 42 which works on the second OS, and creates an image file 55 as a copy of the contents of the first OS partition, on a partition different from the first OS partition, based on the copy identification file 56.

20 Claims, 5 Drawing Sheets

FOREIGN PATENT DOCUMENTS

| | | |
|---|---|---|
| JP | 2001-222337 | 8/2001 |
| JP | 2002-366359 | 12/2002 |
| JP | 2003-76614 | 3/2003 |
| JP | 2003-280914 | 10/2003 |
| JP | 2004-38931 | 2/2004 |

* cited by examiner

INFORMATION PROCESSING APPARATUS, INFORMATION PROCESSING APPARATUS CONTROL PROGRAM, AND INFORMATION PROCESSING APPARATUS CONTROL METHOD

BACKGROUND OF THE INVENTION

1. Field of the Invention

The present invention relates to an information processing apparatus, information processing apparatus control program, and information processing apparatus control method, which copy or recover the contents of a system partition.

2. Description of the Related Art

Conventionally, when a trouble occurs in a system of an information processing apparatus such as a PC (Personal Computer), a recovery using portable recording media such as CD-ROM and DVD-ROM or a HDD (Hard Disk Drive) is taken as a method for recovering a factory-default state of a partition including an OS or a state at a particular time point after staring use of the system.

In case of an information processing apparatus using a portable recording medium for recovery, an emergency OS (Operating System) and an image file which has copied in advance a system partition of a factory default or at a particular time point after starting use of the system are created. In a system trouble, the emergency OS is started up from the portable recording medium, and the image file is copied from the portable recording medium to the system partition. The system partition is thus recovered.

In other case of an information processing apparatus using a HDD for recovery, an image file of a system partition of a factory default or at a particular time point after starting use of the system is created in advance in a region other than the system partition. In a system trouble, the user takes a particular operation at the time of restart, and thereby starts up an emergency OS stored in advance on a hidden partition or a portable recording medium. Thereafter, the image file stored in the hidden partition is copied onto the system partition, thereby to recover the system partition.

A known conventional technique relevant to the present invention is, for example, Japanese Patent application Laid-Open Publication No. 2003-280914. An information device and a recording medium according to this publication include a first partition which stores a normal program, a second partition which stores a recovery program to recover an initial state of the program on the first partition, a boot block which starts up from one of the partitions, and a startup partition switching program which instructs a partition to be started up in the boot block. A BIOS functions to start up the startup partition switching program if a particular input operation is conducted when turning on the power.

In an information processing apparatus using a portable recording medium for recovery, the user has to operate the BIOS (Basic Input/Output System), for example, the user needs to change setting of the BIOS, in order to start up an emergency OS, in a system trouble. However, users who have not enough knowledge cannot operate the BIOS in some cases. Alternatively, if the portable recording medium for recovery is lost or damaged, recovery of the system is impossible.

In another information processing apparatus which uses a HDD for recovery, the user has to conduct a particular operation after turning on the power or startup of the BIOS, in order to start up an emergency OS, in a system trouble. Users who have not enough knowledge cannot operate the BIOS in some cases. Alternatively, if an image file stored on a hidden partition is damaged, the system cannot be recovered.

In order to start up the emergency OS, a startup program existing in the head sector of the HDD and the head sector of the system partition is required. If the head sector of the HDD or the head sector of the system partition is damaged, recovery of the system is impossible.

When a system is copied, there are files that are not accessible during running of the system. Therefore, the user has to shut down the normal OS and starts up the emergency OS, and then has to conduct an operation of copying the contents of the system partition. Users who have not enough knowledge cannot work out such an operation.

SUMMARY OF THE INVENTION

The present invention has been made to solve the above problems, and has an object of providing an information processing apparatus, information processing apparatus control program, and information processing apparatus control method which improve system-recoverability.

To solve the above problems, according to the present invention, an information processing apparatus copies contents of a first program partition among partitions on a recording medium, the first program partition storing a first program as a program which works during normal operation, and the information processing apparatus comprises: a copy setting section which works on the first program, sets startup information in a non-volatile storage when the information processing apparatus is started up next, the startup information giving an instruction about startup of a second program stored on a second program partition as a partition different from the first program partition, sets copy information giving an instruction about copying of the contents of the first program partition, and restarts the information processing apparatus; a startup program which works when the information processing apparatus is started up, and starts up the second program, based on the startup information set in the non-volatile storage; and a copy execution section which works on the second program, and creates a copy file as a copy of the contents of the first program partition, on a partition different from the first program partition, based on the copy information.

The information processing apparatus according to the present invention may be arranged as follows. If recovery of the first program partition is requested, the copy setting section sets the startup information in the non-volatile storage and restarts a computer, and if the copy information has not been set, the copy execution section further recovers the first program partition, based on the copy file.

The information processing apparatus according to the present invention may be arranged as follows. The startup program further starts up the second program, based on an operation conducted by a user when the information processing apparatus is started up, and the copy execution section further recovers the first partition, based on the copy file.

The information processing apparatus according to the present invention may be arranged as follows. The first program partition, the second program partition, and the copy file exist on one identical recording medium.

The information processing apparatus according to the present invention may be arranged as follows. The first program partition exists on the first recording medium, and the second program partition and the copy file exist on a recording medium different from the first recording medium.

The information processing apparatus according to the present invention may be arranged as follows. The copy information is stored as a copy identification file on a partition different from the first program partition.

The information processing apparatus according to the present invention may be arranged as follows. After creating the copy file, the copy execution section changes a file name of the copy identification file or deletes the copy identification file.

The information processing apparatus according to the present invention may be arranged as follows. Information concerning partitions on the recording medium is stored in advance in the non-volatile storage, and the startup program checks the second program partition, based on the information concerning the partitions on the recording medium, and starts up the second program if the second program partition is determined as functioning normally.

The information processing apparatus according to the present invention may be arranged as follows. The first program is an operating system.

Also according to the present invention, an information processing apparatus control program makes a computer copy contents of a first program partition among partitions on a recording medium, the first program partition storing a first program as a program which works during normal operation, and the information processing apparatus control program comprises: a copy setting step that works on the first program, sets startup information in a non-volatile storage when the computer is started up next, the startup information indicative of an instruction about startup of a second program stored on a second program partition as a partition different from the first program partition, sets copy information giving an instruction about copying of the contents of the first program partition, and restarts the information processing apparatus; a copy startup step that starts up the second program, based on the startup information set in the non-volatile storage on the startup program which is executed when the computer is started; and a copy execution step that works on the second program, and creates a copy file as a copy of the contents of the first program partition, on a partition different from the first program partition, if the copy information has been set.

The information processing apparatus control program according to the present invention may be arranged as follows. Further comprised after the copy execution step are: a recovery setting step that works on the first program and, if recovery of the first program partition is requested, sets the startup information in the non-volatile storage and restarts the computer, a recovery startup step that starts up the second program, on the startup program which is executed when the computer is started, and a recovery execution step that works on the second program and, if the copy information has not been set, recovers the first program partition, based on the copy file.

The information processing apparatus control program according to the present invention may be arranged as follows. Further comprised after the recovery execution step are: a recovery startup step that starts up the second program, based on an operation conducted by a user, on the startup program which is executed when the computer is started; and a recovery execution step that works on the second program and recovers the first partition, based on the copy file.

The information processing apparatus control program according to the present invention may be arranged as follows. The first program partition, the second program partition, and the copy file exist on one identical recording medium.

The information processing apparatus control program according to the present invention may be arranged as follows. The first program partition exists on the first recording medium, and the second program partition and the copy file exist on a recording medium different from the first recording medium.

The information processing apparatus control program according to the present invention may be arranged as follows. The copy information is stored as a copy identification file on a partition different from the first program partition.

The information processing apparatus control program according to the present invention may be arranged as follows. After creating the copy file, the copy execution step changes a file name of the copy identification file or deletes the copy identification file.

The information processing apparatus control program according to the present invention may be arranged as follows. Information concerning partitions on the recording medium is stored in advance in the non-volatile storage, and the copy startup step checks the second program partition, based on the information concerning the partitions on the recording medium, and starts up the second program if the second program partition is determined as functioning normally.

The information processing apparatus control program according to the present invention may be arranged as follows. The first program is an operating system.

Also according to the present invention, an information processing apparatus control method is for copying contents of a first program partition among partitions on a recording medium used for an information processing apparatus, the first program partition storing a first program as a program which works during normal operation, and the information processing apparatus control method comprises: a copy setting step that works on the first program, sets startup information in a non-volatile storage when the information processing apparatus is started up next, the startup information indicative of an instruction about startup of a second program stored on a second program partition as a partition different from the first program partition, sets copy information giving an instruction about copying of the contents of the first program partition, and restarts the information processing apparatus; a copy startup step that starts up the second program, based on the startup information set in the non-volatile storage on the startup program which is executed when the information processing apparatus is started; and a copy execution step that works on the second program, and creates a copy file as a copy of the contents of the first program partition, on a partition different from the first program partition, if the copy information has been set.

According to the present invention, the user conducts only simple operations on an normal system. Therefore, even a user who has poor technical knowledge can carry out a partition copy processing of a system for normal operation.

DETAILED DESCRIPTION OF THE PREFERRED EMBODIMENTS

Embodiments of the present invention will now be described with reference to the drawings.

First Embodiment

An example of an information processing apparatus having one HDD will be dealt with in the present embodiment.

Firstly, the hardware configuration of the information processing apparatus according to the present embodiment will be described.

Figure 1:
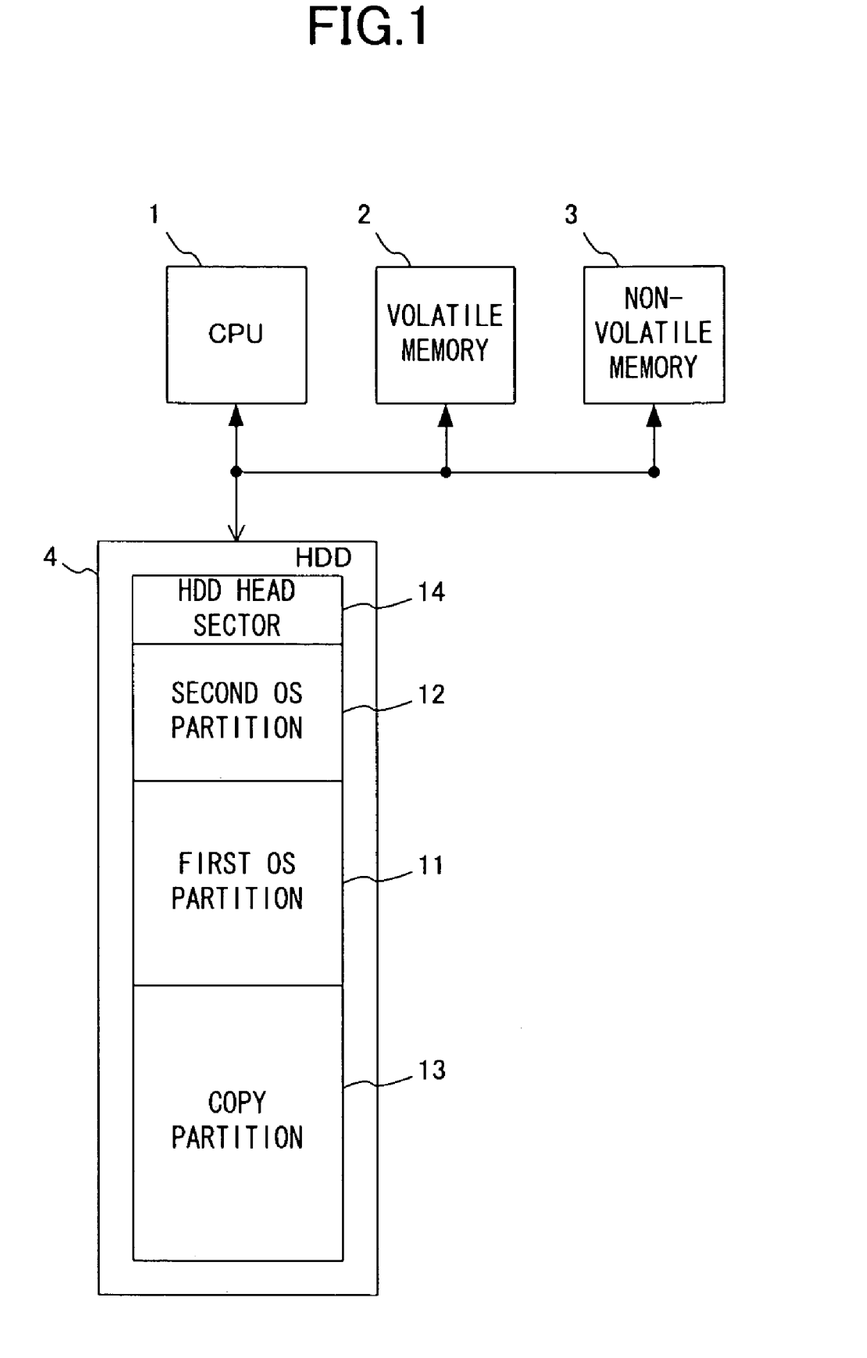
FIG. 1 is a block diagram showing an example of hardware configuration of an information processing apparatus according to the first embodiment.

FIG. 1 is a block diagram showing an example of the hardware configuration of the information processing apparatus according to the first embodiment. The hardware of this information processing apparatus is configured of a CPU 1, a non-volatile memory 2, a non-volatile memory 3, and a HDD 4. The CPU 1 executes a program read into the non-volatile memory 2 from the non-volatile memory 3 or HDD 4. The HDD 4 has a HDD head sector 14 at the head, and other regions, i.e., a first OS partition 11 for storing a first OS described later, a second OS partition 12 for storing a second OS described later, and a copy partition 13 for storing a copy of the first OS partition 11 or the like.

Like conventional information processing apparatuses, the HDD head sector 14 stores a program necessary for startup from the HDD 4, information concerning each partition, and a startup signature indicative of being a bootable HDD. At the top of the first OS partition 11, information of this partition, a program necessary for startup of this partition, and a startup signature indicative of being a bootable partition are stored. Stored likewise at the top of the second OS partition 12 are information of this partition, a program necessary for startup of this partition, and a startup signature indicative of being a bootable partition.

Next, software configuration of the information processing apparatus according to the present embodiment will be described.

Figure 2:
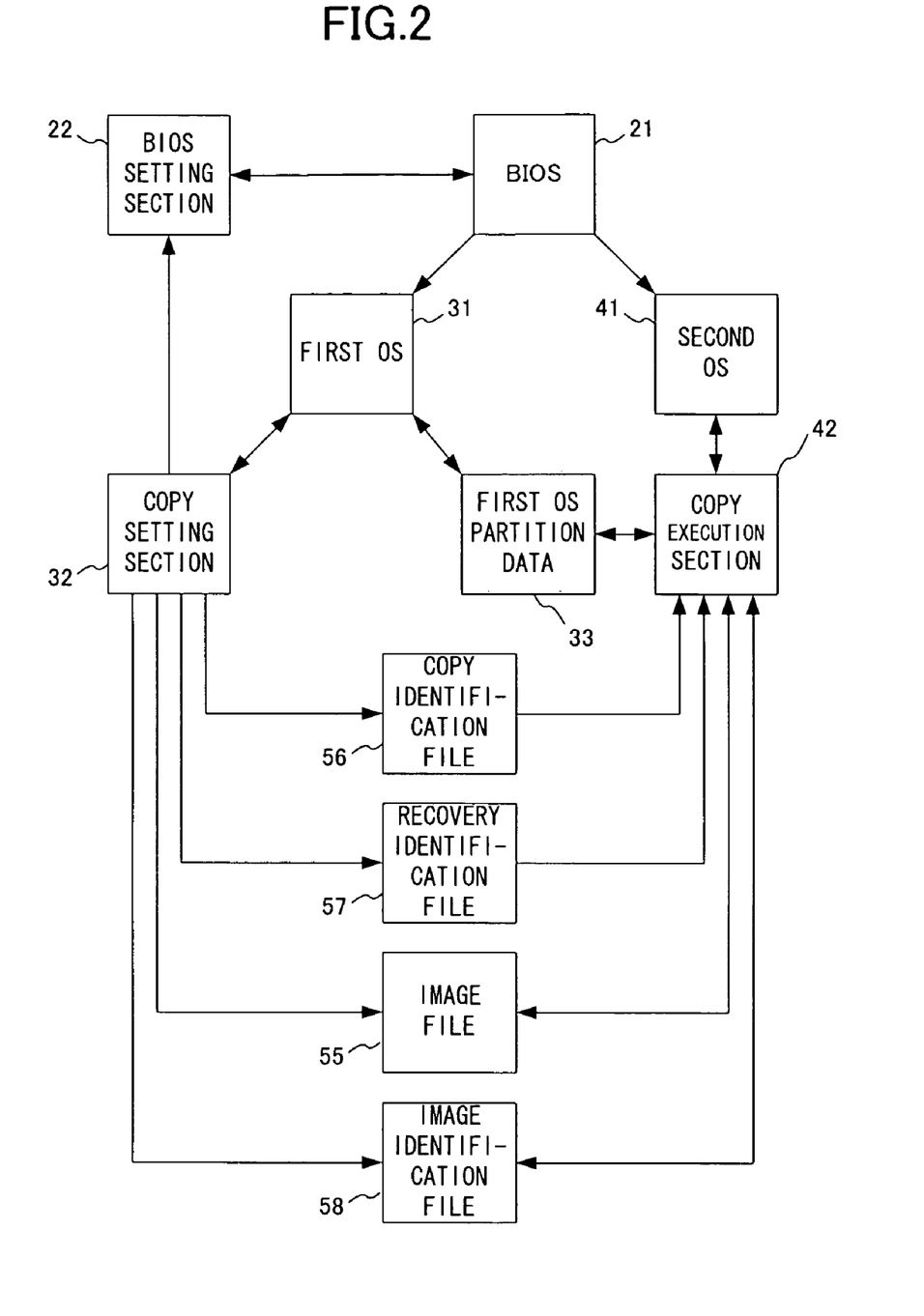
FIG. 2 is a block diagram showing an example of software configuration of an information processing apparatus according to the present invention.

FIG. 2 is a block diagram showing an example of the software configuration of the information processing apparatus according to the present invention. The software of this information processing apparatus is configured of a BIOS 21, a BIOS setting section 22, a first OS 31, a copy setting section 32, first OS partition data 33, a second OS 41, a copy execution section 42, an image file 55, a copy identification file 56, a recovery identification file 57, and an image identification file 58.

The BIOS 21 and BIOS setting section 22 are stored in the non-volatile memory 3. The first OS 31, copy setting section 32, and first OS partition data 33 are stored in the first OS partition 11. Also, the second OS 41 and copy execution section 42 are stored in the second OS partition 12. The image file 55, copy identification file 56, recovery identification file 57, and image identification file 58 are stored in the copy partition 13. In the initial state, none of the image file 55, copy identification file 56, recovery identification file 57, and image identification file 58 exists. There may be plural image files 55 and plural image identification files 58 in the copy partition 13.

On the first OS 31, for example, the first OS partition 11 is used as a drive C which is a system drive, as well as the copy partition 13 as a drive D. The second OS partition 12 is dealt with as a hidden partition which is accessible only from the first OS 31.

The BIOS 21 is a program which is executed to start up the information processing apparatus. The BIOS setting section 22 serves to store the setting of the BIOS 21. In addition to settings used by a conventional BIOS, the BIOS setting section 22 has information concerning a startup identifier and each partition. The first OS 31 is an OS for normally operating the information processing apparatus while the second OS 41 is an OS which works to execute a first OS partition copy processing or a first OS partition recovery processing. The startup identifier is set to one of values indicative of second and first OS startup modes. In the second OS startup mode, the second OS 41 is started up when starting up the information processing apparatus, and the first OS partition copy processing or the first OS partition recovery processing is executed. In the first OS startup mode, the first OS 31 is started up, and normal operation is carried out. During normal operation, the startup identifier is set to the first OS startup mode.

The first OS partition data 33 is data other than the first OS 31 and the copy setting section 32 in the first OS partition 11. The first OS partition data 33 is a target of the first OS partition copy processing. The copy setting section 32 is an application program which works on the first OS 31, and sets the first OS partition copy processing or the first OS partition recovery processing. The copy execution section 42 is an application program which works on the second OS 41, and executes the first OS partition copy processing or the first OS partition recovery processing.

The copy identification file 56 is a file to instruct the copy execution section 42 from the copy setting section 32 about execution of the first OS partition copy processing. Likewise, the recovery identification file 57 is a file to instruct the copy execution section 42 from the copy setting section 32 about execution of the first OS partition recovery processing. The image file 55 is a copy of the first OS partition 11 and is created by the first OS partition copy processing. The image identification file 58 is created corresponding to the image file 55, and has information concerning the image file 55.

Next, operation of the information processing apparatus according to the present embodiment will be described.

Firstly, a description will be made of operation of the copy setting section 32 which works on the first OS 31 of the information processing apparatus.

Figure 3:
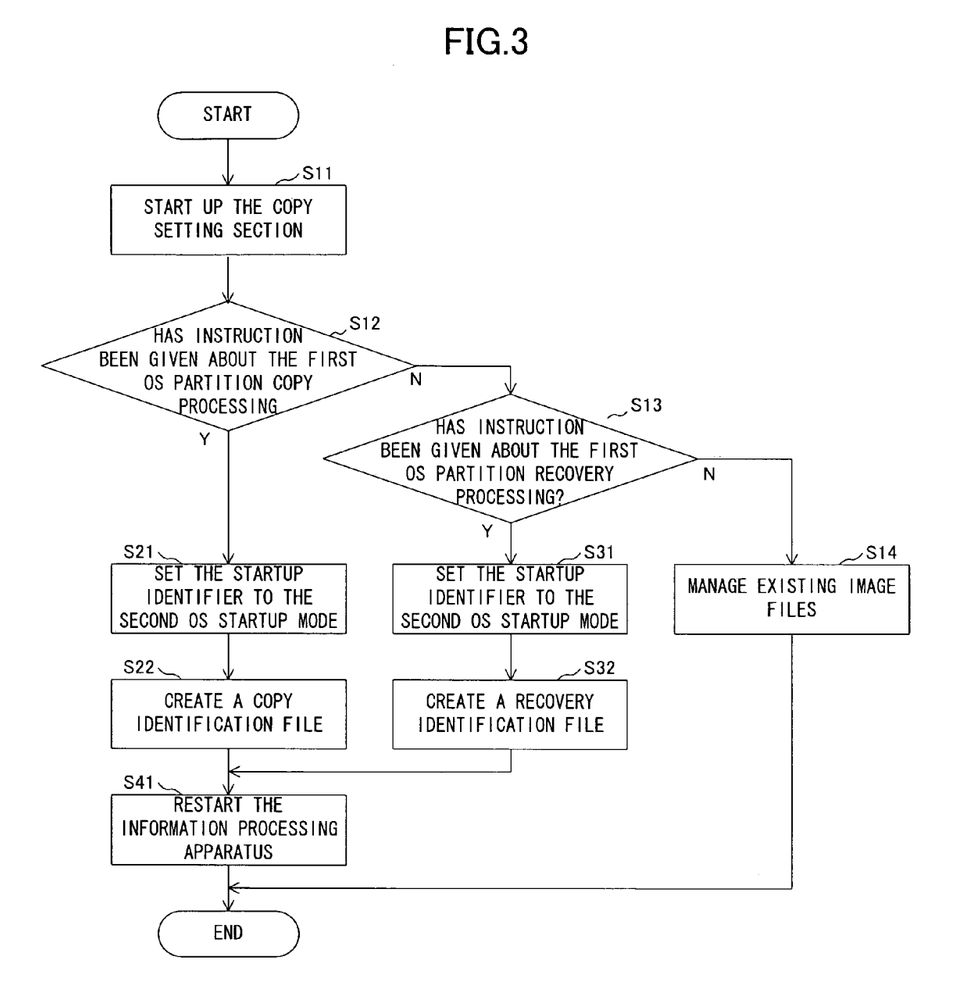
FIG. 3 is a flowchart showing an example of operation of a copy setting section in the information processing apparatus according to the present invention.

FIG. 3 is a flowchart showing an example of operation of the copy setting section of the information processing apparatus according to the present invention. Firstly, the copy setting section 32 is started up upon an instruction from a user on the first OS 31 (S11). The copy setting section 32 then obtains the user's instruction, and determines whether the user's instruction is about the first OS partition copy processing or not (S12).

If the instruction is about the first OS partition copy processing (S12, Y), the copy setting section 32 sets the startup identifier to the second OS startup mode (S21), creates a copy identification file 56 in the copy partition 13 (S22), and restarts the information processing apparatus (S41). Then, the copy setting section 32 terminates this flow. In this flow, the copy setting section 32 may let the copy identification file 56 include a comment inputted from the user.

Otherwise, if the user's instruction is not about the first OS partition copy processing, the copy setting section 32 determines whether the user's instruction is about a first OS partition recovery processing or not (S13).

If the user's instruction is about the first OS partition recovery processing (S13, Y), the copy setting section 32 sets the startup identifier to the value indicative of the second OS startup mode (S31), creates a recovery identification file 57 in the copy partition 13 (S32), and goes to the processing step S41.

Otherwise, if the user's instruction is not about the first OS partition recovery processing (S13, N), the copy setting section 32 manages existing image files 55 (S14), and terminates this flow. In this flow, in the management of existing image files 55, the copy setting section 32 displays a list of existing image files 55 stored on the copy partition 13, a button to copy a selected image file 55 into a portable recording medium, and a button to delete a selected image file 55, etc. The copy setting section 32 also waits for (or accepts) an instruction from the user, and executes copying or deletion of an image file 55 in accordance with an instruction from the user. The displayed list of the existing image files 55 may adopt information concerning comments and the like in the image identification file 58.

Next, operation of the information processing apparatus at the time of startup will be described.

Figure 4:
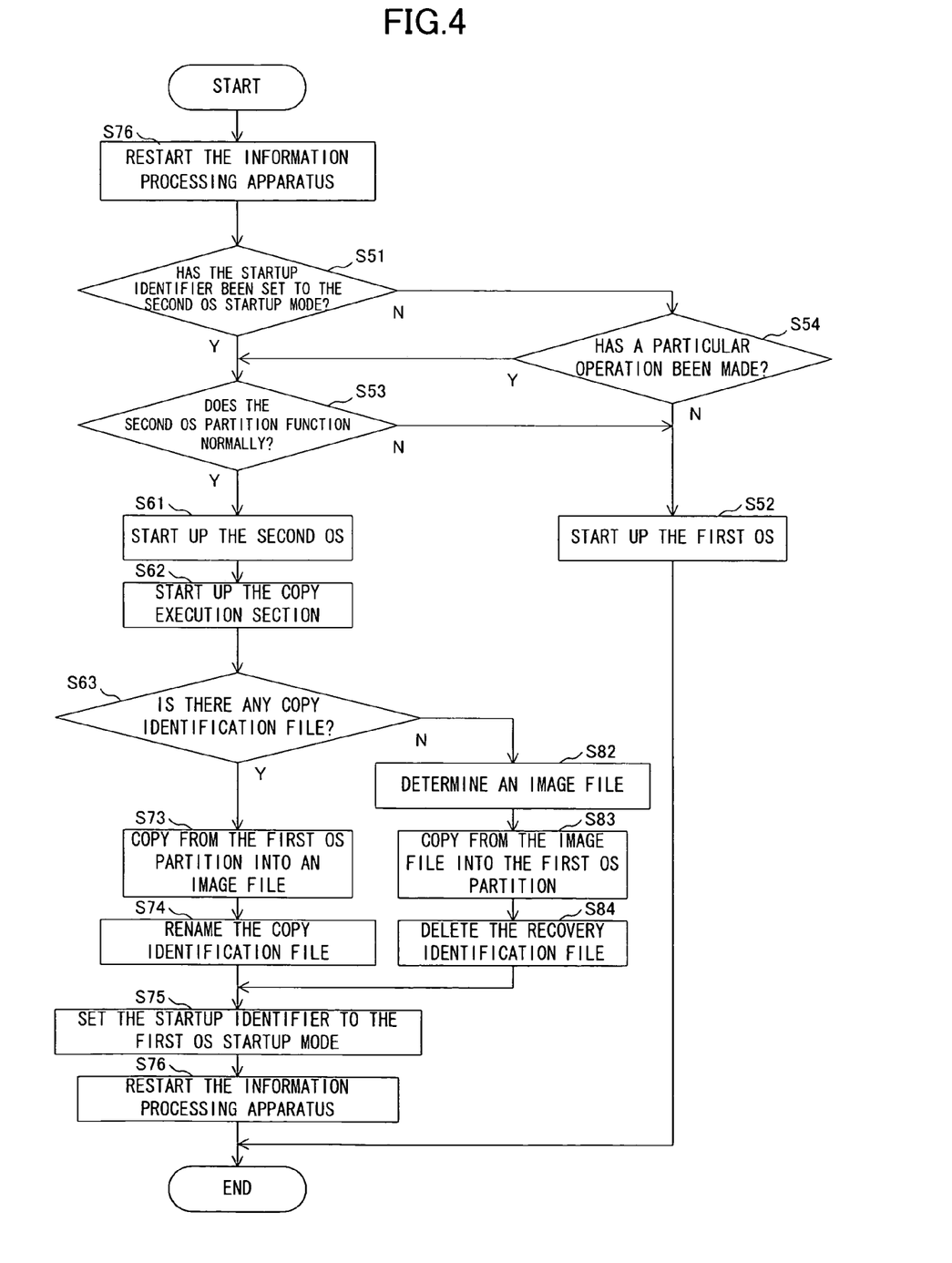
FIG. 4 is a flowchart showing an example of operation at the time of starting up the information processing apparatus according to the present invention.

The startup of the information processing apparatus includes startup upon power-on of the information processing apparatus powered off and restart like the processing step S41. FIG. 4 is a flowchart showing an example of operation at the startup of the information processing apparatus according to the present invention. This flow is executed when the information processing apparatus is started up, e.g., on the occasion of restart (S41) by the copy setting section 32, startup after a system trouble, etc. Firstly, the BIOS 21 refers to the BIOS setting section 22 and determines whether the startup identifier has been set to the second OS startup mode or not (S51).

If the startup identifier has not been set to the second OS startup mode, i.e., if the startup identifier has been set to the first OS startup mode (S51, N), the BIOS 21 determines whether a particular operation has been made by a user or not (S54). If there has been no particular operation (S54, N), the BIOS 21 starts up the first OS 31 (S52) and terminates this flow. Otherwise, if there has been any particular operation (S54, Y), the BIOS 21 goes to the processing step S53. A particular operation is, for example, as follows. When starting up the information processing apparatus, the user presses down a function key or the like, to make the BIOS 21 display a startup menu. On the menu, the user selects a processing which requires a first OS partition copy processing, first OS partition recovery processing, or startup of the second OS 41. The startup menu shows selectable options, such as recording media used for startup, settings of the BIOS, and the like, in addition to the first OS partition copy processing and the first OS partition recovery processing.

If the startup identifier has been set to the second OS startup mode (S51, Y), the BIOS 21 checks the second OS partition 12, and determines whether the second OS partition 12 functions normally or not (S53). In the check of the second OS partition 12, the BIOS 21 checks that the partition ID of the second OS partition 12 which is stored at the HDD head sector 14 is a predetermined value. The BIOS 21 further checks that the startup signature of the second OS partition 12 which is stored at the head sector of the second OS partition 12 is a predetermined value. If all of these values are proper, the BIOS 21 determines that the second OS partition 12 functions normally.

If the second OS partition 12 is determined to be abnormal (S53, N), the flow goes to the processing step S52. Otherwise, if the second OS partition 12 is determined as functioning normally (S53, Y), the BIOS 21 starts up the second OS 41 (S61). Next, the second OS 41 starts up the copy execution section 42. The copy execution section 42 determines whether there is a copy identification file 56 or not (S63).

If there is a copy identification file 56 (S63, Y), the copy execution section 42 creates a copy of the first OS partition data 33 as an image file 55 on the copy partition 13 (S73). The copy execution section 42 displays a notification to notify the user of an operating state of the first OS partition copy processing. Upon completion of copying of the first OS partition 11, the copy execution section 42 renames the copy identification file 56 so as to correspond to the name of the image file 55, and takes this image file as an image identification file 58 (S74). The copy execution section 42 also sets the value of the startup identifier to the first OS startup mode, in the BIOS setting section 22 (S75), restarts the information processing apparatus (S76), and terminates this flow.

Otherwise, if there is no copy identification file 56 (S63, N), the copy execution section 42 determines an image file 55 used for the first OS partition recovery processing, in accordance with an instruction from the user (S82). The copy execution section 42 also makes a copy of the image file 55 on the copy partition 13, on the first OS partition 11, and takes the copy as new first OS partition data 33 (S83). The copy execution section 42 displays a notification to notify the user of an operating state of the first OS partition recovery processing. Upon completion of copying of the image file 55, the recovery identification file 57 is deleted (S84), and the flow goes to the processing S75.

Second Embodiment

In the present embodiment, an example of an information processing apparatus having two HDDs will be described.

Hardware configuration of the information processing apparatus according to the present embodiment will be described first.

Figure 5:
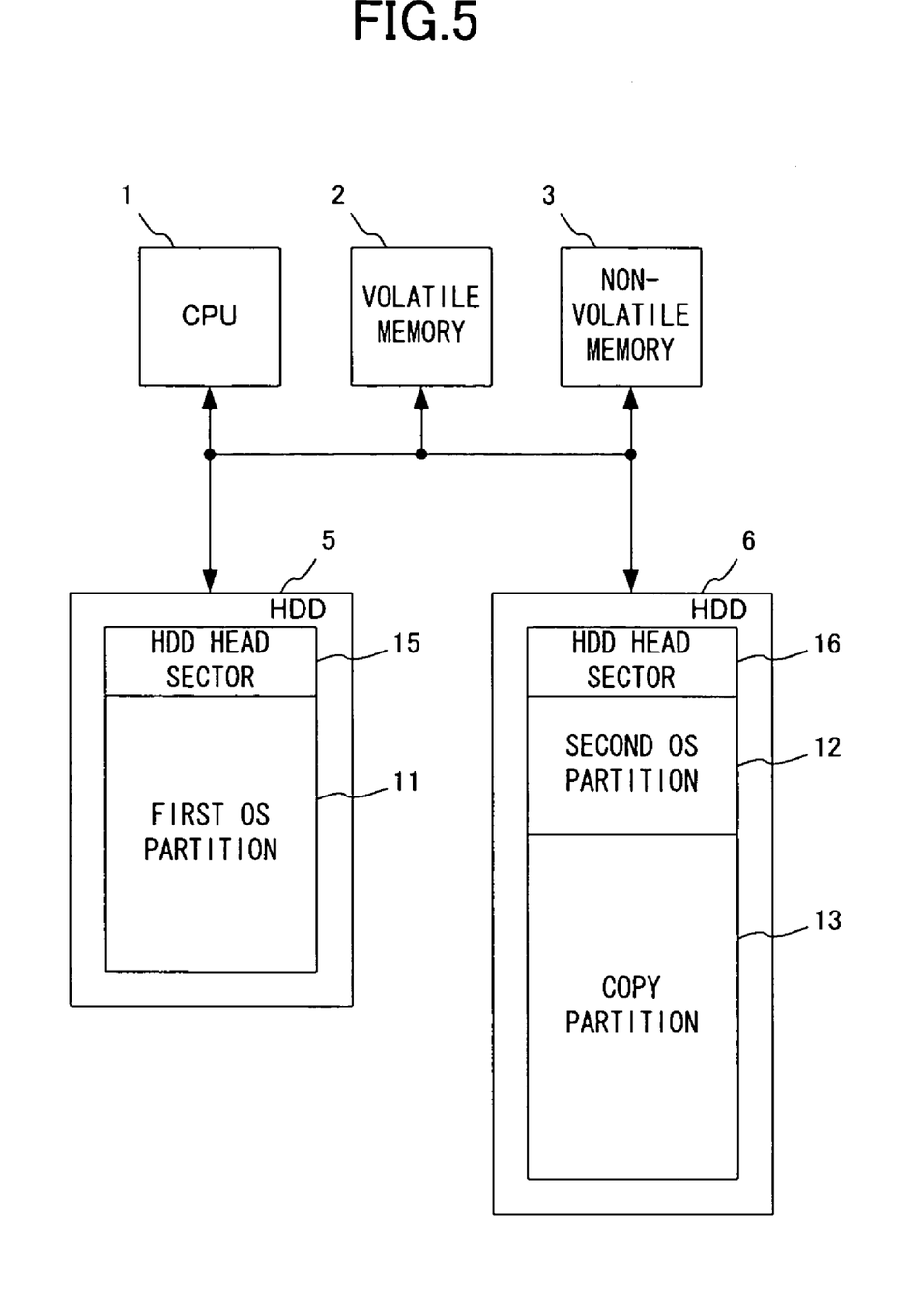
FIG. 5 is a block diagram showing an example of hardware configuration of an information processing apparatus according to the second embodiment.

FIG. 5 is a block diagram showing an example of the hardware configuration of the information processing apparatus according to the second embodiment. In FIG. 5, the same reference symbols as shown in FIG. 1 denote the identical as or equivalent components to those shown in FIG. 1. Descriptions of those components will be omitted herefrom. In place of one HDD 4 shown in FIG. 1, FIG. 5 shows two HDDs 5 and 6 comprised.

The HDD 5 has a HDD head sector 15 at its own head, and also a first OS partition 11 as another region. The HDD 6 has a HDD head sector 16 at its own head, and also a copy partition 13 and second OS partition 12 as other regions. The HDD head sector 15 stores a program required for startup from the HDD 5, like a conventional information processing apparatus, information concerning each partition in the HDD 5, and a startup signature indicative of being a bootable HDD. Likewise, the HDD head sector 16 stores a program required for startup from the HDD 6, information concerning each partition in the HDD 6, and a startup signature indicative of being a bootable HDD.

At first, software configuration of the information processing apparatus according to the present embodiment will now be described.

The information processing apparatus according to the present embodiment has the same software configuration as that according to the first embodiment.

Next, operation of the information processing apparatus according to the present embodiment will be described.

The operation of the information processing apparatus according to the present embodiment on the first OS is the same as that according to the first embodiment. Also, the operation of the information processing apparatus at the time of startup is the same as that in the first embodiment. However, in the check of the second OS partition 12 in the processing step S53, the BIOS 21 checks that the partition ID of the second OS partition 12 stored in the HDD head sector 16 is a predetermined value, and further checks that the startup signature of the second OS partition 12 stored in the head sector of the second OS partition 12 is a predetermined value. If these values are all proper, the BIOS 21 determines that the second OS partition 12 functions properly.

According to the present embodiment, the HDD 5 having the first OS partition 11 and the HDD 6 having the second OS partition 12 are recording media independent from each other. Therefore, even when the first OS 31 cannot be started up due to a physical damage on the HDD 5 or a logical damage on the HDD head sector 15, the second OS 41 in the HDD 6 and the copy execution section 42 start up. Hence, the first OS partition recovery processing for recovery of the image file 55 can be executed on an external HDD newly connected or another HDD connected as a substitution for the damaged HDD 5. By using the external HDD or another HDD as a new first OS partition 11, the information processing apparatus can be recovered rapidly and easily.

According to the first and second embodiments, the first OS partition copy processing can be automatically executed if the user carries out only a simple operation on the first OS 31. Therefore, even a user who has less technical knowledge can easily conduct the first OS partition copy processing. Likewise, if the user carries out a simple operation on the first OS 31, the first OS partition recovery processing can be automatically executed. Therefore, even a user with less technical knowledge can conduct the first OS partition recovery processing. Further, if the user only selects an image file 55 to be used for the first OS partition recovery processing or only manages image files 55, the user can recover the first OS partition at an arbitrary time point when the user conducted the first OS partition copy processing.

A conventional information processing apparatus needs a head sector of a partition which a normal OS uses, in order to start up an emergency OS. If this head sector is damaged, recovery is impossible. According to the first embodiment, however, even when the head sector of the first OS partition 11 is damaged logically, the BIOS 21 starts up the second OS 41, and hence, recovery of the information processing apparatus is possible. Further, according to the second embodiment, even when the HDD 5 is physically damaged, the first OS partition 11 can be recovered from the HDD 6 into a substitutional HDD. The information processing apparatus can hence be recovered.

In the first embodiment, the BIOS 21 checks the partition ID of the second OS partition 12 stored in the HDD head sector 14, in the check (S53) of the second OS partition 12. However, the embodiment may be arranged as follows. That is, information of the HDD head sector 14 may be stored in the BIOS setting section 22, and the BIOS 21 may check the partition ID of the second OS partition 12 stored in the BIOS setting section 22. In this way, the second OS 41 can be started up even when the HDD head sector 14 is damaged.

Similarly, in the second embodiment, the BIOS 21 checks the partition ID of the second OS partition 12 stored in the HDD head sector 16, in the check (S53) of the second OS partition 12. However, the embodiment may be arranged as follows. That is, information of the HDD head sector 16 may be stored in the BIOS setting section 22, and the BIOS 21 may check the partition ID of the second OS partition 12 stored in the BIOS setting section 22. In this way, the second OS 41 can be started up even when the HDD head sector 16 is damaged.

Also, in the first and second embodiments, the second OS 41 and the copy execution section 42 are stored in advance on the second OS partition 12. However, in the initial state, the second OS 41 and the copy execution section 42 need not exist in the second OS partition 12. In this case, before the information processing apparatus firstly carries out the first OS partition copy processing, the second OS 41 and the copy execution section 42 are created on the second OS partition 12 with use of a portable recording medium in which the second OS 41 and copy execution section 42 are stored, in advance, for example.

Also, in the first and second embodiments, if the first OS partition recovery processing is carried out, the first OS partition 11 is overwritten by an image file 55, and therefore, the first OS partition data 33 updated after creation of the image file 55 is lost. In order to prevent the data 33 from being lost, a difference between the currently existing first OS partition data 33 and the image file 55 used for recovery may be stored before carrying of the first OS partition recovery processing. After the first OS partition recovery processing, this difference may be reflected on the first OS partition 11.

Also, in the first and second embodiments, the image file 55 is created by the copy execution section 42. An image file 55 as a copy of a factory-default first OS partition 11 may be stored in advance. Also, in the first and second embodiments, the image file 55 is created as a copy of the first OS partition 11. However, as far as the first OS partition 11 can be recovered, the image file may alternatively be constituted by plural files indicative of the contents of the first OS partition 11 or a file in which the contents of the first OS partition 11 are compressed.

Also, in the first and second embodiments, when the copy setting section 32 instructs the first OS partition copy processing, this section 32 creates a copy identification file 56. When the copy setting section 32 instructs the first OS partition recovery processing, this section 32 creates a recovery identification file 57. However, the copy setting section 32 may create no recovery identification file 57 when instructing the first OS partition recovery processing but the copy execution section 42 may execute the first OS partition copy processing if a copy identification file 56 exists and may execute the first OS partition recovery processing if no copy identification file 56 exists.

Further, a program to make a computer constituting an information processing apparatus execute each of the steps described above can be provided as an information processing apparatus control program. Where stored in a recording medium readable from a computer, this program can be executed by a computer constituting an information processing apparatus. Examples of the recording medium readable from a computer may include an internal storage device built in a computer, such as a ROM or RAM, a portable storage medium such as a CD-ROM, flexible disk, DVD disk, magneto-optical disk, IC card, or the like, a database which stores computer programs, another computer, and a database thereof.

A copy file corresponds to the image file in the above embodiments. A first program corresponds to the first OS in the embodiments. A second program corresponds to the second OS in the embodiments. A startup program corresponds to the BIOS in the embodiments. A non-volatile storage corresponds to the non-volatile memory in the embodiments. Further, startup information corresponds to the startup identifier in the embodiments.

A copy setting step corresponds to processing steps S21, S22, and S41 in the embodiments. A copy startup step corresponds to the processing steps S51, S53, S54, and S61 in the embodiments. A copy execution step corresponds to the processing steps S73 and S74 in the embodiments. A recovery startup step corresponds to the processing steps S51, S53, and 54 in the embodiments. A recovery execution step corresponds to the processing steps S82, S83, and S84 in the embodiments. Further, a recovery setting step corresponds to the processing steps S31, S31, and S41 in the above embodiments.

What is claimed is:

1. An information processing apparatus that copies contents of a first program partition among partitions on a recording medium, the first program partition storing a first program as a program that works during normal operation, the information processing apparatus comprising:

a copy setting section, operating in a context of the first program, to set startup information in a non-volatile memory, the startup information indicating an instruction to start a second program when the information processing apparatus is started next, the second program being stored on a second program partition that is different from the first program partition, to set copy information indicating an instruction about copying of the contents of the first program partition, and to restart the information processing apparatus;

a startup program section to start the second program when the information processing apparatus is started, based on the startup information set in the non-volatile memory; and a copy execution section, operating in a context of the second program, to create a copy file that is a copy of the contents of the first program partition on a partition different from the first program partition when the copy information is set in the non-volatile memory, and to delete the copy information set in the non-volatile memory after the copy file is created.

2. The information processing apparatus according to claim 1, wherein if recovery of the first program partition is requested, the copy setting section sets the startup information in the non-volatile memory, and restarts a computer, and if the copy information is not set, the copy execution section further recovers the first program partition, based on the copy file.

3. The information processing apparatus according to claim 1, wherein the startup program section further starts the second program, based on an operation conducted by a user when the information processing apparatus is started, and the copy execution section further recovers the first partition, based on the copy file.

4. The information processing apparatus according to claim 1, wherein the first program partition, the second program partition, and the copy file exist on a same recording medium.

5. The information processing apparatus according to claim 1, wherein the first program partition exists on the first recording medium, and the second program partition and the copy file exist on a recording medium different from the first recording medium.

6. The information processing apparatus according to claim 1, wherein the copy information is stored as a copy identification file on a partition different from the first program partition.

7. The information processing apparatus according to claim 6, wherein after creating the copy file, the copy execution section changes a file name of the copy identification file or deletes the copy identification file.

8. The information processing apparatus according to claim 1, wherein information concerning partitions on the recording medium is stored in advance in the non-volatile memory, and the startup program section checks the second program partition, based on the information concerning the partitions on the recording medium, and starts the second program if the second program partition is determined as functioning normally.

9. The information processing apparatus according to claim 1, wherein the first program is an operating system.

10. A computer readable medium including an information processing apparatus control program that makes a computer copy contents of a first program partition among partitions on a recording medium, the first program partition storing a first program as a program that works during normal operation, the information processing apparatus control program causing the computer to perform operations comprising:

setting, in the context of the first program, startup information in a non-volatile memory, the startup information being indicative of an instruction to start a second program when the computer is started next, the second program being stored on a second program partition that is different from the first program partition;

setting, in the context of the first program, copy information indicating an instruction about copying of the contents of the first program partition;

restarting, in the context of the first program, the information processing apparatus;

starting the second program, based on the startup information set in the non-volatile memory;

creating, in the context of the second program, a copy file that is a copy of the contents of the first program partition on a partition different from the first program partition when the copy information is set in the non-volatile memory; and deleting the copy information set in the non-volatile memory after the copy file is created.

11. The computer readable medium according to claim 10, the operations further comprising:

setting, after the creating, the startup information in the non-volatile memory if recovery of the first program partition is requested, and recovering the first program partition, based on the copy file, if the copy information is not set.

12. The computer readable medium according to claim 10, wherein the starting of the second program is based on an operation conducted by a user, and the recovering recovers the first partition, based on the copy file.

13. The computer readable medium according to claim 10, wherein the first program partition, the second program partition, and the copy file exist on one identical recording medium.

14. The computer readable medium according to claim 10, wherein the first program partition exists on the first recording medium, and the second program partition and the copy file exist on a recording medium different from the first recording medium.

15. The computer readable medium according to claim 10, wherein the copy information is stored as a copy identification file on a partition different from the first program partition.

16. The computer readable medium according to claim 15, the operations further comprising:

changing a file name of the copy identification file or deleting the copy identification file after the creating.

17. The computer readable medium according to claim 10, the operations further comprising:

storing information concerning partitions on the recording medium in the non-volatile memory, wherein the starting of the second program checks the second program partition, based on the information concerning the partitions on the recording medium, and starts the second program if the second program partition is determined as functioning normally.

18. The computer readable medium according to claim 10, wherein the first program is an operating system.

19. An information processing apparatus control method for copying contents of a first program partition among partitions on a recording medium used for an information processing apparatus, the first program partition storing a first program as a program which works during normal operation, the information processing apparatus control method comprising:

setting, in the context of the first program, startup information in a non-volatile memory, the startup information being indicative of an instruction to start a second program when the information processing apparatus is started next, the second program being stored on a second program partition that is different from the first program partition;

setting, in the context of the first program, copy information indicating an instruction about copying of the contents of the first program partition;

restarting, in the context of the first program, the information processing apparatus;

starting the second program, based on the startup information set in the non-volatile memory;

creating, in the context of the second program, a copy file that is a copy of the contents of the first program partition on a partition different from the first program partition when the copy information is set in the non-volatile memory; and deleting the copy information set in the non-volatile memory after the copy file is created.

20. The information processing apparatus control method according to claim 19, wherein the first program is an operating system.

* * * * *